(12) United States Patent
Liu (10) Patent No.: US 9,894,094 B2
(45) Date of Patent: Feb. 13, 2018

(54) METHOD, SERVER, AND SYSTEM FOR AUTOMATICALLY RATING REPUTATION OF A WEB SITE

(71) Applicant: TENCENT TECHNOLOGY (SHENZHEN) COMPANY LIMITED, Shenzhen (CN)

(72) Inventor: Jian Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 196 days.

(21) Appl. No.: 14/748,058

(22) Filed: Jun. 23, 2015

(65) Prior Publication Data
US 2015/0295951 A1    Oct. 15, 2015

Related U.S. Application Data

(63) Continuation of application No. PCT/CN2013/087458, filed on Nov. 20, 2013.

(30) Foreign Application Priority Data

Dec. 24, 2012   (CN) .......................... 2012 1 0566983

(51) Int. Cl.
*H04L 29/06*   (2006.01)
*G06F 21/57*   (2013.01)

(52) U.S. Cl.
CPC ........ *H04L 63/1441* (2013.01); *G06F 21/577* (2013.01); *H04L 63/1425* (2013.01); *G06F 2221/2119* (2013.01)

(58) Field of Classification Search
USPC ........................................................ 726/22
See application file for complete search history.

(56) References Cited

U.S. PATENT DOCUMENTS 8,185,956 B1    5/2012 Bogorad et al.
2002/0099844 A1*  7/2002 Baumann ................ H04L 47/10
                                                            709/232

(Continued)

FOREIGN PATENT DOCUMENTS

CN    101079768 A    11/2007
CN    102609511 A     7/2012

(Continued)

OTHER PUBLICATIONS

International Preliminary Report and Written Opinion of the International Searching Authority for International Application No. PCT/CN2013/087458, dated Feb. 27, 2014, in 6 pages.

(Continued)

*Primary Examiner* — William J. Goodchild
(74) *Attorney, Agent, or Firm* — Knobbe Martens Olson & Bear LLP (57) ABSTRACT

The present disclosure discloses a method, server, and system for automatically rating the reputation of a web site, wherein the method comprises: when a web address of the web site is triggered and intercepted, detecting whether the web address of the web site is a malicious web address or a non-malicious web address; making statistics of the number of malicious and non-malicious visits to the web addresses under the web site during a predefined time period and saving the statistics to a database; and reading records from the database and calculating an average reputation of the web site by weighting the statistics of visiting the web site during the predefined time period and history statistics. The present disclosure is able to mark the reputation of a web site in time and efficiently, thus improving the security of using the network.

12 Claims, 3 Drawing Sheets

(56) References Cited

U.S. PATENT DOCUMENTS

2006/0095404 A1* 5/2006 Adelman .......... G06F 17/30867
2006/0253458 A1* 11/2006 Dixon .................... G06Q 30/02
2011/0055923 A1* 3/2011 Thomas ............... G06Q 10/107
                                                                    726/23
2012/0102545 A1* 4/2012 Carter, III ......... G06F 17/30864
                                                                    726/3
2012/0117650 A1* 5/2012 Nachenberg .......... G06F 21/562
                                                                    726/24

FOREIGN PATENT DOCUMENTS

| CN | 101500000 B | 8/2012 |
| CN | 102724190 A | 10/2012 |
| WO | WO 2008/039784 A2 | 4/2008 |

OTHER PUBLICATIONS

Development of Website Reliability Authentication in China of Year 2012, in 31 pages.
Office Action Issued in Chinese Patent Application No. 201210566983.6 dated Sep. 5, 2016 in 9 pages.
International Search Report for International Application No. PCT/CN2013/087458, dated Feb. 27, 2014.
Office Action issued in Chinese Application No. 201210566983.6, dated Apr. 1, 2016, 9 pages.
Hundreds of Colleges and Universities are Hit, PC Manager Issues Early Warnings on Large-Scale Outbreak of Trojans in College and Universities dated Jul. 6, 2012, in 2 pages.

* cited by examiner

METHOD, SERVER, AND SYSTEM FOR AUTOMATICALLY RATING REPUTATION OF A WEB SITE

CROSS REFERENCE TO RELATED APPLICATIONS

This application is a continuation application of PCT Patent Application No. PCT/CN2013/087458, filed on Nov. 20, 2013, which claims the benefit and priority of Chinese Patent Application No. 201210566983.6 filed on Dec. 24, 2012, both of which are incorporated by reference in their entireties.

TECHNICAL FIELD

The present disclosure relates to the technical field of internet technology, and particularly to a method, server and system for automatically rating reputation of a web site.

BACKGROUND

Currently, emphasis of the criteria for rating a web site is on the metrics of the popularity of the web site, e.g., PageRank ranking of Google, web site ranking of Alexa, etc.

The basic idea of the PageRank ranking of Google is that the popularity of a web site is proportional to the number of web sites that link to the web site and the popularity of the web sites that link to the web site. The specific calculation formula thereof is as follows:

$$PR(u) = d \cdot \sum_{v \in L(u)} PR(v)/N(v) + (1-d) \qquad (1)$$

where PR(u) denotes the PageRank value of a web site u, L(u) denotes a set of web pages that point to the web site u, N(v) denotes the number of outbound links from a web page v, and d denotes an attenuation factor, the value of which is between 0 and 1, and typically is 0.85.

The web site ranking of Alexa determines the popularity of a web site by calculating the accumulated number of reaches to the web site and average page views of the users in recent three months.

However, with the popularity of the network, network security problems also become increasingly severe, and malicious accidents of phishing, fraud, and propagation of Trojan viruses emerge one after another, while the above criteria of evaluating the popularity of a web site are not efficient enough to mark the security degree of a web site. Even a web site with high popularity may also be a web site hung up with Trojans or a phishing web site after it is hacked by a hacker, thus threatening the security of the users.

Currently, there have been some third parties who mark the security degree for web sites, wherein a famous one is such like the "credible web site" validation released by the company knet.cn, it marks the reputation of web sites by manual checking and charges a certain amount of annuity fees for web sites that have passed the validation. However, there are a lot of limitations in marking web sites by using such a kind of black-and-white list:

firstly, the application range thereof is relatively small, and mainly aims to profitable enterprises' web sites, while there is not enough motivation for personal web sites and non-profitable enterprises' web sites to pay for this kind of validation;

secondly, for web sites whose security information is under unknown status, it cannot help the user to efficiently distinguish malicious web sites from safe web sites; and furthermore, even if a web site has passed the validation, it may also issue falsity information after it is frequently hacked by hackers as to being hung up with Trojans or the web pages thereof are changed, and thus simple manual authorization cannot respond to dynamic changes of the content of the web sites on time.

SUMMARY

The present disclosure is to provide a method, server and system for automatically rating reputation of a web site, intending to efficiently mark the security degree of the web site and enhance the security of using the network.

The present disclosure provides a method for automatically rating reputation of a web site, comprising: detecting whether a web address of the web site is a malicious web address or a non-malicious web address, when the web address is intercepted; making statistics of the number of malicious and non-malicious visits to web addresses under the web site during a predefined time period and saving the statistics to a database; and reading records from the database and calculating average reputation of the web site by weighting the statistics of visiting the web site during the predefined time period and history statistics.

The present disclosure also provides a server for automatically rating reputation of a web site, comprising: a web address detection module, to detect whether a web address of the web site is a malicious web address or a non-malicious web address, when the web address of the web site is triggered and intercepted; a web site visit statistic module, to make statistics of the number of malicious and non-malicious visits to web addresses under the web site during a predefined time period and save the statistics to a database; and a web site reputation calculation module, to read records from the database and calculate average reputation of the web site by weighting the statistics of visiting the web site during the predefined time period and history statistics.

The present disclosure also provides a system for automatically rating reputation of a web site, comprising: a client and a server, wherein: the client is configured to intercept a web address of the web site; and the server is configured to detect whether the web address of the web site is a malicious web address or a non-malicious web address, make statistics of the number of malicious and non-malicious visits to web addresses under the web site during a predefined time period and save the statistics to a database; and read records from the database and calculating average reputation of the web site by weighting the statistics of visiting the web site during the predefined time period and history statistics.

The present disclosure provides a device for rating reputation of a web site, comprising: one or more processors; a memory; and one or more program modules stored in the memory and to be executed by the one or more processors, the one or more program modules comprise: a web address detection module, to detect whether a web address of the web site is a malicious web address or a non-malicious web address, when the web address of the web site is triggered and intercepted; a web site visit statistic module, to make statistics of the number of malicious and non-malicious visits to web addresses under the web site during a predefined time period and save the statistics to a database; and a web site reputation calculation module, to read records from the database and calculate average reputation of the web site by weighting the statistics of visiting the web site during the predefined time period and history statistics.

The present disclosure provides a non-transitory computer-readable storage medium comprising a set of instructions for rating reputation of a web site, the set of instructions to direct at least one processor to perform acts of: detecting whether a web address of the web site is a malicious web address or a non-malicious web address, when the web address of the web site is triggered and intercepted; making statistics of the number of malicious and non-malicious visits to web addresses under the web site during a predefined time period and saving the statistics to a database; and reading records from the database and calculating average reputation of the web site by weighting the statistics of visiting the web site during the predefined time period and history statistics.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

The implementation, functions, features and advantages of the present disclosure will be further described in combination with the examples and by reference to the accompanying drawings.

DETAILED DESCRIPTION

Reference will now be made in detail to examples, which are illustrated in the accompanying drawings. In the following detailed description, numerous specific details are set forth in order to provide a thorough understanding of the present disclosure. Also, the figures are illustrations of an example, in which modules or procedures shown in the figures are not necessarily essential for implementing the present disclosure. In other instances, well-known methods, procedures, components, and circuits have not been described in detail so as not to unnecessarily obscure aspects of the examples.

The solution of the present disclosure is: detecting whether a web address of a web site is a malicious web address or a non-malicious web address, when a user visits the web address and the web address is intercepted; making statistics of the number of malicious and non-malicious visits to the web addresses under the web site during a predefined time period and saving the statistics to a database; and calculating average reputation of the web site by weighting the statistics of visiting the web site during the predefined time period and history statistics, thus improving the security of using the network.

Figure 1:
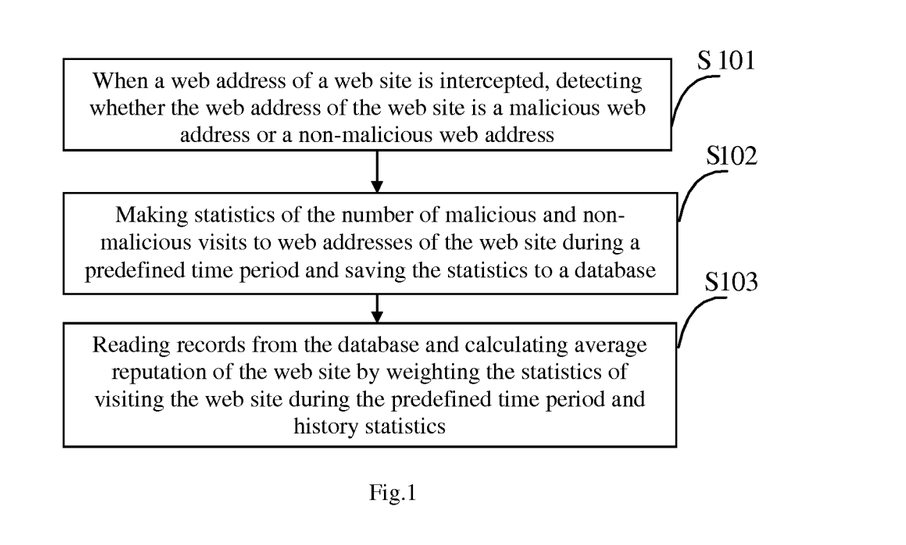
FIG. 1 is a schematic diagram of a flowchart of the method for automatically rating reputation of a web site of an example of the present disclosure.

Please referring to FIG. 1, FIG. 1 is a schematic diagram of a flowchart of the method for automatically rating reputation of a web site according to an example of the present disclosure.

As shown in FIG. 1, the method for automatically rating reputation of a web site includes the following steps:

In Step S101, when a web address of the web site is triggered and intercepted, detect whether the web address of the web site is a malicious web address or a non-malicious web address.

The executive body of the present exemplary method can be a server used for network security detection, such as a PC manager server, a mobile server, etc., and at the server, a web address detection module, a web site visit statistic module, a web site reputation calculation module and a web site visit statistic database used for storing data are set.

For example, when a user of a client, e.g., a PC manager client corresponding to the PC manager server visits a web address of a certain web site so that the web address of the web site is triggered, the PC manager client will firstly intercept the web address, send it to the web address detection module of the server to perform a series of security detection, including identifying various phishing, fraud information and hanged Trojan codes, etc., and if it finds that the web address is a malicious web address, then it can prompt the user to stop visiting.

In Step S102, make statistics of the number of malicious and non-malicious visits to web addresses of the web site during a predefined time period and save the statistics to a database; the database is a web site visit statistic database.

The web site visit statistic module of the server collects the detected conditions of the web address, makes statistics of the number of white-and-black visits to web addresses of respective web sites according to a predefined time period (e.g., according to the day), and stores the statistics to the web site visit statistic database. The white-and-black visits to the web addresses of the respective web sites respectively refer to malicious visits and non-malicious visits to the web addresses of the respective web sites, and if the number of black visits is 1, then it means that the user visits a malicious web address under the web site once, and if the number of white visits is 1, then it means that the user visits a non-malicious web address under the web site once.

The web site here refers to a site address ended with a top-level domain such as ".com", ".cn", ".net", etc., and the web address refers to the address of a page of a specific web site, e.g., the web site www.example.com comprises a normal page www.example.com/1.htm and a maliciously changed page www.example.com/2.htm.

In Step 103, read records from the database and calculate average reputation of the web site by weighting the statistics of visiting the web site during the predefined time period and history statistics.

Taking making statistics of the web site visit data of a day as an example, the present disclosure calculates average reputation of the web site by weighting the statistics of visiting the web site of the day and the history statistics, in which the history statistics are statistics of the days before the current day.

The average reputation of the web site is calculated by using the following formula:

$$R(u) = \frac{\sum_{i=1}^{N} w_i \cdot [1 - \log_2(1 + x_i(u))]}{\sum_{i=1}^{N} w_i};$$  (2)

where $x_i(u)$ denotes a ratio of the number of black visits to a web site u of the $i^{th}$ day before the current day to the total number of visits to the web site u of the current day; N denotes a valid period, indicating that only visit conditions of the web site u during N days will be considered; and $w_i$ is a weight related to time. Generally speaking, the smaller the i is, the larger the weight is, which means that a more recent visit record has a larger influence on the result. When for all $i \in [1,N]$, $x_i(u)$ is 0 (no malicious browsing records), it can be known from the above formula (2) that $R_{max}(u)=1$; and when $x_i(u)$ are all 1 (malicious browse records occur during a long period), $R_{min}(u)=0$; while for a general web site, the value of R(u) commonly is between 0 and 1.

Examples are as follows:

Assume that N=3; $w_i=0.5^{i-1}$, $i \in [1, 3]$; for a web site, the malicious visits to the web site in recent 3 days occupy ratios of $x_1=0.1$, $x_2=x_3=0$; then the reputation of the web site is calculated according to the formula (2) as follows:

$$R = \frac{(1 - \log_2 1.1) + 0.5 + 0.25}{1 + 0.5 + 0.25} = 0.92$$

So the network security and reliability of the web site can be judged according to the calculated reputation R, and web sites with high reputation generally will not threat the user's security, while web sites with low reputation should be avoided to visit.

The present example quantitatively analyzes and marks the reputation of a web site from the security point of view by using the above scheme, the scheme is different from the web site evaluation criteria for the web site popularity in the traditional art, by calculating and evaluating the domain reputation automatically by the server, it can effectively avoid the influence of subjective factors during the manual check, thus guarantees the objectiveness and fairness of the evaluation criteria, and therefore, by marking the reputation of a web site in time and efficiently, improves the security of using the network, and fills the deficiency of lacking web site security information such like that of Google PageRank and Alexa ranking.

Figure 2:
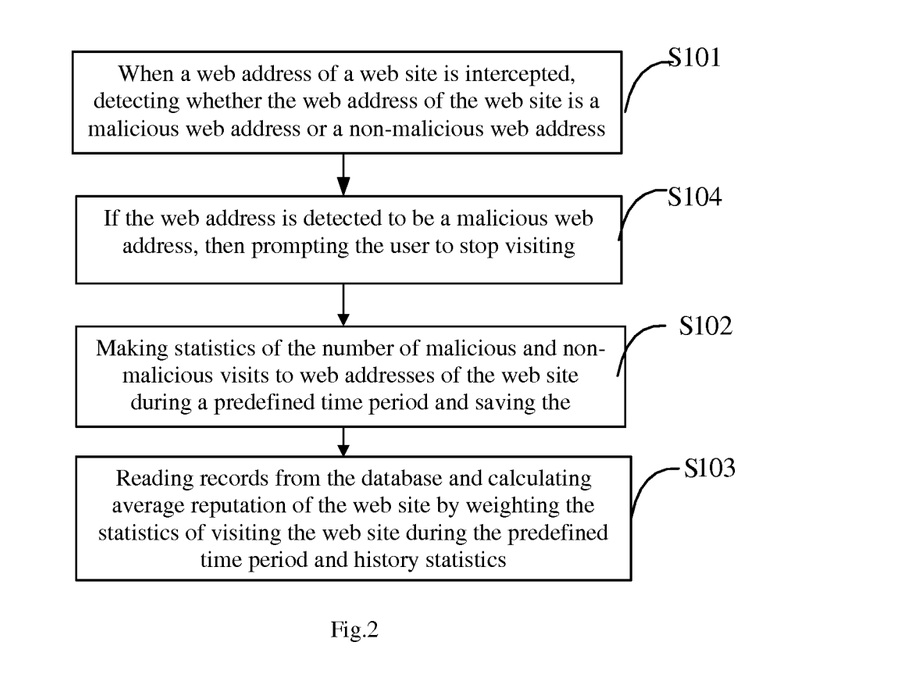
FIG. 2 is a schematic diagram of a flowchart of the method for automatically rating reputation of a web site of another example of the present disclosure.

Please referring to FIG. 2, FIG. 2 is a schematic diagram of a flowchart of the method for automatically rating reputation of a web site of another example of the present disclosure.

As shown in FIG. 2, the present example provides a method for automatically rating reputation of a web site, based on the above example illustrated in FIG. 1, after the step S101, it further comprises:

In Step S104, if the web address is detected to be a malicious web address, then prompt the user to stop visiting it.

The difference between the present example and the example in FIG. 1 is that, the present example prompts the user to stop visiting when a web address is detected to be a malicious web address, thus improving the security of the user visiting the web site; other parts are the same with the example shown in FIG. 1.

Then the current scheme has the following advantages:

1. The coverage thereof is larger, since as long as a user of the client visits the web site, the web site will be automatically included by the system, while the coverage of manual check is relatively low due to the condition limitations, therefore the coverage of web sites that pass the reputation validation is low;

2. The objectiveness and fairness of the judgment criteria can be guaranteed, since automatically calculating and evaluating the reputation of domain names by the server can efficiently avoid the influence of subjective factors during the manual check; and 3. Changes to web pages of a destination web site can be responded to in time. As is known from the above formula (2) that, generally speaking, the most recent view record has the largest influence on the result, and when a web site encounters malicious changes, the black visits thereof will rise rapidly, resulting in that the proportion of black visits of the day will increase and the reputation thereof will decrease; thus potential problems of a web site can be found in time by monitoring abnormal fluctuation of the reputation of the web site.

It is to be illustrated that, the application of the technical scheme of the present example includes but is not limited to automatically marking and displaying the web site reputation on the search engine search result, an input address bar of a browser, etc.

Figure 3:
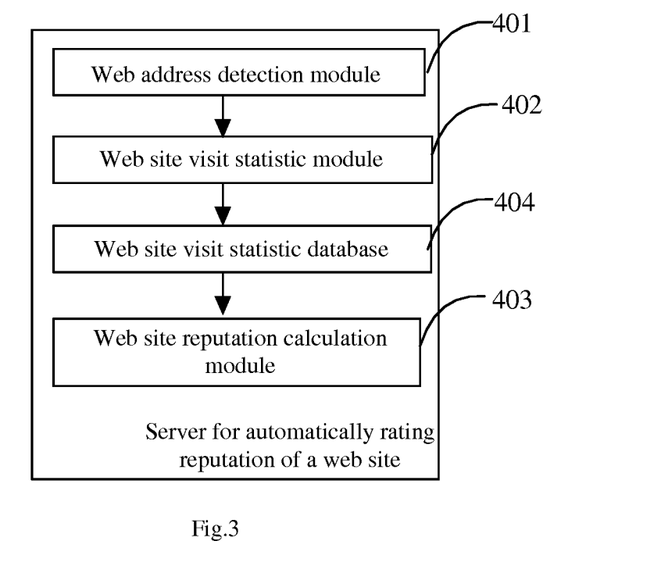
FIG. 3 is a schematic diagram of a structure of the server for automatically rating reputation of a web site of an example of the present disclosure.

Please referring to FIG. 3, FIG. 3 is a schematic diagram of a structure of the server for automatically rating reputation of a web site of an example of the present disclosure.

As shown in FIG. 3, the present example proposes a server for automatically rating reputation of a web site, comprising: a web address detection module 401, a web site visit statistic module 402, a web site reputation calculation module 403 and a web site visit statistic database 404 used for storing data, wherein:

the web address detection module 401 is configured to, when a web address of the web site is triggered and intercepted, detect whether the web address of the web site is a malicious web address or a non-malicious web address; and when the web address is detected to be a malicious web address, prompt the user to stop visiting; the web site visit statistic module 402 is configured to make statistics of the number of malicious and non-malicious visits to web addresses under the web site during a predefined time period and save the statistics to the web site visit statistic database 404; and the web site reputation calculation module 403 is configured to read records from the web site visit statistic database 404 and calculate average reputation of the web site by weighting the statistics of visiting the web site during the predefined time period and history statistics.

The server of the present example is used for network security detection, e.g., a PC manager server. At the server, a web address detection module 401, a web site visit statistic module 402, a web site reputation calculation module 403 and a web site visit statistic database 404 used for storing data are set.

When a user of a client, for example, a PC manager client corresponding to the PC manager server, visits a web address of a certain web site so that the web address of the web site is triggered, the PC manager client will firstly intercept the web address and send it to the web address detection module 401 of the server to perform a series of security detection, including identifying various phishing, fraud information and hung up Trojan codes, etc., and if the web address detection module 401 detects that the web address is a malicious web address, then prompts the user to stop visiting.

Meanwhile, the web site visit statistic module 402 of the server collects the detected conditions of the web address, makes statistics of the number of white-and-black visits to web addresses of respective web sites based on a predefined time period (e.g., based on a day), and stores the statistics to the web site visit statistic database 404. The white-and-black visits to the web addresses of the respective web sites respectively refer to malicious visits and non-malicious visits to the web addresses of the respective web sites, and if the number of black visits is 1, then it means that the user visits a malicious web address under the web site once, and if the number of white visits is 1, then it means that the user visits a non-malicious web address under the web site once.

The web site here refers to a site address ended with a top-level domain such as ".com", ".cn", ".net", etc., and the web address refers to the address of a page under a specific web site, e.g., the web site www.example.com comprises a normal page www.example.com/1.htm and a maliciously changed page www.example.com/2.htm.

After that, the web site reputation calculation module 403 reads records from the web site visit statistic database 404 and calculates average reputation of the web site by weighting the statistics of visiting the web site during the predefined time period and history statistics, in which the history statistics are statistics of days before a current day.

Taking making statistics of the web site visit data of a day as an example, the present disclosure calculates average reputation of the web site by using the above formula (2) to weight the statistics of visiting the web site of the current day and the history statistics, in which the history statistics are statistics of days before the current day.

In the formula (2), $x_i$ (u) denotes a ratio of the number of black visits to a web site u of the $i^{th}$ day before the current day to the total number of visits to the web site u of the current day; N denotes a valid period, indicating that only visit conditions of the web site u during N days will be considered; $w_i$ is a weight related to time.

Generally speaking, the smaller the i is, the larger the weight is, which means that a more recent visit record has a larger influence on the result. When for all i $\in[1,N]$, $x_i(u)$ is 0, (no malicious browse records), it can be known from the above formula (2) that $R_{max}(u)=1$; and when $x_i$ (u) are all 1 (malicious browse records occur during a long period), $R_{min}(u)=0$; while for a general web site, the value of R(u) is commonly between 0 and 1.

Examples are as follows:

Assume that N=3; $w_i=0.5^{i-1}$, i$\in[1, 3]$; for a web site, the malicious visits to the web site in recent 3 days occupy ratios of $x_1=0.1$, $x_2=x_3=0$; then the reputation of the web site is calculated according to the formula (2) as follows:

$$R = \frac{(1 - \log_2 1.1) + 0.5 + 0.25}{1 + 0.5 + 0.25} = 0.92$$

So the network security and reliability of the web site can be judged according to the calculated reputation R.

The present example quantitatively analyzes and marks the reputation of a web site from the security point of view by using the above scheme, the scheme is different from the web site evaluation criteria for the web site popularity in the traditional art, by calculating and evaluating the domain reputation automatically by the server, it can effectively avoid the influence of subjective factors during the manual check, thus guarantees the objectiveness and fairness of the evaluation criteria, and therefore, by marking the reputation of a web site in time and efficiently, improves the security of using the network, and fills the deficiency of lacking web site security information such like that of Google PageRank and Alexa ranking. Furthermore, after it detects that the web address is a malicious web address, it prompts the user to stop visiting, which further improves the security of the user visiting the web site.

Figure 4:
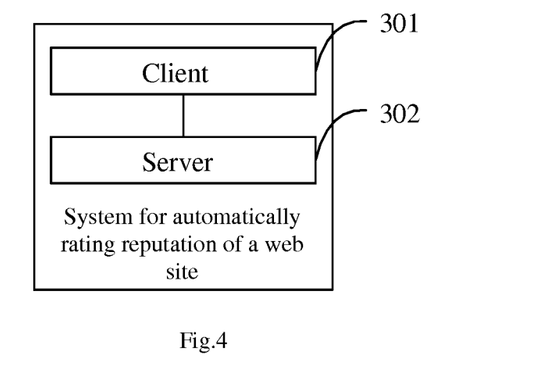
FIG. 4 is a schematic diagram of a structure of the system for automatically rating reputation of a web site of another example of the present disclosure.

As shown in FIG. 4, the example of the present disclosure proposes a system for automatically rating reputation of a web site, including: a client 301 and a server 302.

The client 301 is configured to, when a web address of the web site is triggered, intercept the web address and send the web address to the server for detecting.

The server 302 is configured to detect whether the web address of the web site is a malicious web address or a non-malicious web address; make statistics of the number of malicious and non-malicious visits to web addresses under the web site during a predefined time period and save the statistics to a database; and calculate average reputation of the web site by weighting the statistics of visiting the web site during the predefined time period and history statistics.

Specifically, when a user visits a web address of a certain web site so that the web address of the web site is triggered, the client 301 will intercept the web address and send the web address to the server 302 to perform a series of security detection, including identifying various phishing, fraud information and hanged Trojan codes, etc. If the server 302 finds out that the web address is a malicious web address, then the server can prompt the user of the client 301 to stop visiting.

The server 302 collects the detected conditions of the web address, makes statistics of the number of black-and-white visits to the web addresses under respective web sites according to a predefined time period (e.g., the day), and stores the statistics to the web site visit statistic database. The white-and-black visits to the web addresses of the respective web sites respectively refer to malicious visits and non-malicious visits to the web addresses of the respective web sites, and if the number of black visits is 1, then it means that the user visits a malicious web address under the web site once, and if the number of white visits is 1, then it means that the user visits a non-malicious web address under the web site once.

The web site here refers to a site address ended with a top-level domain such as ".com", ".cn", ".net", etc., and the web address refers to the address of a page of a specific web site, e.g., the web site www.example.com comprises a normal page www.example.com/1.htm and a maliciously changed page www.example.com/2.htm.

After that, the server 302 reads records from the web site visit statistic database and calculates average reputation of the web site by weighting the statistics of visiting the web site during the predefined time period and history statistics, in which the history statistics are statistics of days before the day.

Taking making statistics of the web site visit data of a day as an example, the present disclosure calculates average reputation of the web site by using the above formula (2) to weight the statistics of visiting the web site of the day and the history statistics.

In the formula (2), $x_i$ (u) denotes the ratio of the number of black visits to the web site u of the $i^{th}$ day before the current day to the total number of visits to the web site u of the current day; N denotes a valid period, indicating that only visit conditions of the web site u during N days will be considered; and $w_i$ is a weight related to time.

Generally speaking, the smaller the i is, the larger the weight is, which means that a more recent visit record has a larger influence on the result. When for all i $\in$[1,N], $x_i(u)$ is 0, (no malicious browse records), it can be known from the above formula (2) that $R_{max}(u)=1$; and when $x_i(u)$ are all 1 (malicious browse records occur during a long period), $R_{min}(u)=0$; while for a general web site, the value of R(u) commonly is between 0 and 1.

Examples are as follows:

Assume that N=3; $w_i 0.5^{i-1}$, i $\in$[1, 3]; for a web site, the malicious visits to the web site in recent 3 days occupy ratios of $x_1=0.1$, $x_2=x_3=0$; then the reputation of the web site is calculated according to the formula (2) as follows:

$$R = \frac{(1 - \log_2 1.1) + 0.5 + 0.25}{1 + 0.5 + 0.25} = 0.92$$

So the network security and reliability of the web site can be judged according to the calculated reputation R.

Then compared with the prior art, the current scheme has the following advantages:

1. The coverage is larger, since as long as a user of the client visits the web site, the web site will be automatically included by the system, while the coverage of manual check is relatively low due to the condition limitations, therefore the coverage of web sites that pass the reputation validation is low;

2. The objectiveness and fairness of the judgment criteria can be guaranteed, since automatically calculating and evaluating the reputation of domain names by the server can efficiently avoid the influence of subjective factors during the manual check; and 3. Changes to web pages of a destination web site can be responded to in time. As is known from the above formula (2) that, generally speaking, the most recent view record has the largest influence on the result, and when a web site encounters malicious changes, the black visits thereof will rise rapidly, resulting in that the ratio of black visits of the day will increase and the reputation thereof will decrease; thus potential problems of a web site can be found in time by monitoring abnormal fluctuation of reputation of the web site.

Figure 5:
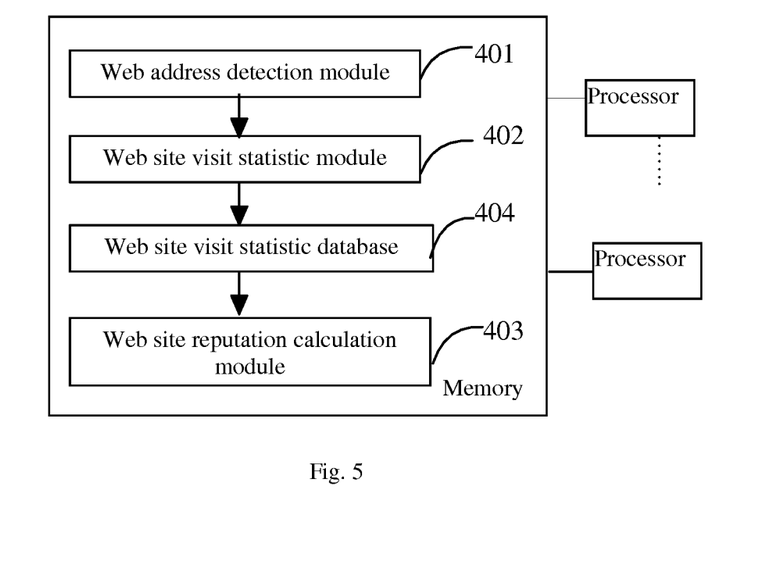
FIG. 5 is a schematic diagram of a structure of a device for automatically rating reputation of a web site of another example of the present disclosure.

Referring to FIG. 5, which is a schematic diagram of a structure of a device for automatically rating reputation of a web site of another example of the present disclosure. According to the FIG. 5, the present disclosure further provides a device for rating reputation of a web site, comprising: one or more processors; a memory; and one or more program modules stored in the memory and to be executed by the one or more processors, wherein the one or more program modules comprise: a web address detection module 401, to detect whether a web address of the web site is a malicious web address or a non-malicious web address, when the web address of the web site is triggered and intercepted; a web site visit statistic module 402, to make statistics of the number of malicious and non-malicious visits to web addresses under the web site during a predefined time period and save the statistics to a database; and a web site reputation calculation module 403, to read records from the database and calculate average reputation of the web site by weighting the statistics of visiting the web site during the predefined time period and history statistics, and a web site visit statistic database 404, to store the statistics.

Furthermore, the present disclosure provides a non-transitory computer-readable storage medium comprising a set of instructions for rating reputation of a web site, the set of instructions to direct at least one processor to perform acts of: detecting whether a web address of the web site is a malicious web address or a non-malicious web address, when the web address of the web site is triggered and intercepted; making statistics of the number of malicious and non-malicious visits to web addresses under the web site during a predefined time period and saving the statistics to a database; and reading records from the database and calculating average reputation of the web site by weighting the statistics of visiting the web site during the predefined time period and history statistics.

It is to be illustrated that, the application of the technical scheme of the present example includes but is not limited to automatically marking and displaying the web site reputation on the search engine search result, an input address bar of a browser, etc.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

The above examples may be implemented by hardware, software, firmware, or a combination thereof. For example the various methods, processes and functional modules described herein may be implemented by a processor (the term processor is to be interpreted broadly to include a CPU, processing unit/module, ASIC, logic module, or programmable gate array, etc.). The processes, methods and functional modules may all be performed by a single processor or split between several processors; reference in this disclosure or the claims to a 'processor' should thus be interpreted to mean 'one or more processors'. The processes, methods and functional modules are implemented as machine readable instructions executable by one or more processors, hardware logic circuitry of the one or more processors or a combination thereof. The modules, if mentioned in the aforesaid examples, may be combined into one module or further divided into a plurality of sub-modules. Further, the examples disclosed herein may be implemented in the form of a software product. The computer software product is stored in a non-transitory storage medium and comprises a plurality of instructions for making an electronic device implement the method recited in the examples of the present disclosure.

What is claimed is:

1. A method for rating reputation of a web site, comprising:
   detecting whether a web address of the web site is a malicious web address or a non-malicious web address, in response to the web address of the web site being intercepted;
   making statistics of a number of malicious and non-malicious visits to web addresses under the web site during a predefined time period and saving the statistics to a database, wherein a malicious visit is a visit to a malicious web address under the web site and a non-malicious visit is a visit to a non-malicious web address under the web site; and reading records from the database and calculating average reputation of the web site by weighting the statistics of visiting the web site during the predefined time period and history statistics, wherein a more recent statistic has a larger weight for the average reputation of the web site;

wherein the predefined time period is a day; and the average reputation of the web site is calculated by using the following formula to weight the statistics of visiting the web site during the predefined time period and the history statistics:

$$R(u) = \frac{\sum_{i=1}^{N} w_i \cdot [1 - \log_2(1 + x_i(u))]}{\sum_{i=1}^{N} w_i};$$

where $x_i(u)$ denotes a ratio of the number of black visits to a web site u of the $i^{th}$ day before the day to a total number of visits to the web site u of the day; N denotes a valid period; and $w_i$ is a weight related to time.

2. The method according to claim 1, wherein after the step of detecting whether the web address of the web site is the malicious web address or the non-malicious web address, the method comprises:

in response to detecting the web address is the malicious web address, prompting a user to stop visiting.

3. The method according to claim 1, wherein the history statistics are statistics of days before the predefined time period.

4. The method according to claim 1, wherein a value of R(u) is between 0 and 1.

5. A server for rating reputation of a web site, comprising:
a web address detection module, to detect whether a web address of the web site is a malicious web address or a non-malicious web address, in response to the web address of the web site being intercepted;
a web site visit statistic module, to make statistics of a number of malicious and non-malicious visits to web addresses under the web site during a predefined time period and save the statistics to a database, wherein a malicious visit is a visit to a malicious web address under the web site and a non-malicious visit is a visit to a non-malicious web address under the web site; and
a web site reputation calculation module, to read records from the database and calculate average reputation of the web site by weighting the statistics of visiting the web site during the predefined time period and history statistics;
wherein the predefined time period is a day; and calculating the average reputation of the web site by weighting the statistics of visiting the web site during the predefined time period and the history statistics is using a formula:

$$R(u) = \frac{\sum_{i=1}^{N} w_i \cdot [1 - \log_2(1 + x_i(u))]}{\sum_{i=1}^{N} w_i};$$

where, $x_i(u)$ denotes a ratio of the number of black visits to a web site u of the $i^{th}$ day before the day to a total number of visits to the web site u of the day; N denotes a valid period; and $w_i$ is a weight related to time.

6. The server according to claim 5, wherein the server is also to prompt a user to stop visiting, in response to detecting the web address is the malicious web address.

7. The server according to claim 5, wherein the history statistics are statistics of days before the predefined time period.

8. The server according to claim 5, wherein a value of R(u) is between 0 and 1.

9. A system for rating reputation of a web site, comprising: a server and a client, wherein:
the client is to intercept a web address of the web site in response to the web address being triggered; and send the web address to the server; and
the server is to detect whether the web address of the web site is a malicious web address or a non-malicious web address; make statistics of a number of malicious and non-malicious visits to web addresses under the web site during a predefined time period; save the statistics to a database, wherein a malicious visit is a visit to a malicious web address under the web site and a non-malicious visit is a visit to a non-malicious web address under the web site; read records from the database; and calculate average reputation of the web site by weighting the statistics of visiting the web site during the predefined time period and history statistics;
wherein the predefined time period is a day; and the average reputation of the web site is calculated by using the following formula to weight the statistics of visiting the web site during the predefined time period and the history statistics:

$$R(u) = \frac{\sum_{i=1}^{N} w_i \cdot [1 - \log_2(1 + x_i(u))]}{\sum_{i=1}^{N} w_i};$$

where $x_i(u)$ denotes a ratio of the number of black visits to a web site u of the $i^{th}$ day before the day to a total number of visits to the web site u of the day; N denotes a valid period; and $w_i$ is a weight related to time.

10. The system according to claim 9, wherein the client is to prompt a user to stop visiting in response to detecting the web address is the malicious web address.

11. The system according to claim 9, wherein the history statistics are statistics of days before the predefined time period.

12. The system according to claim 9, wherein a value of R(u) is between 0 and 1.

* * * * *

UNITED STATES PATENT AND TRADEMARK OFFICE
CERTIFICATE OF CORRECTION

PATENT NO. : 9,894,094 B2
APPLICATION NO. : 14/748058
DATED : February 13, 2018
INVENTOR(S) : Jian Liu It is certified that error appears in the above-identified patent and that said Letters Patent is hereby corrected as shown below:

In the Specification

In Column 7 at Line 45 (approx.), Change "i $\varepsilon[1,N]$," to --i$\varepsilon[1,N]$,--.

In Column 9 at Line 6 (approx.), Change "i $\varepsilon[1,N]$," to --i$\varepsilon[1,N]$,--.

In Column 9 at Line 14 (approx.), Change "$w_i 0.5^{i-1}$, i $\varepsilon[1, 3]$;" to --$w_i = 0.5^{i-1}$, i$\varepsilon[1, 3]$;--.

Signed and Sealed this
Nineteenth Day of June, 2018

Andrei Iancu
*Director of the United States Patent and Trademark Office*